United States Patent
Ghatak

(10) Patent No.: US 11,854,148 B2
(45) Date of Patent: Dec. 26, 2023

(54) VIRTUAL CONTENT DISPLAY OPPORTUNITY IN MIXED REALITY

(71) Applicant: Microsoft Technology Licensing, LLC, Redmond, WA (US)

(72) Inventor: Kausik Ghatak, Bengaluru (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 518 days.

(21) Appl. No.: 16/193,428

(22) Filed: Nov. 16, 2018

(65) Prior Publication Data
US 2020/0160602 A1 May 21, 2020

(51) Int. Cl.
*G06T 19/00* (2011.01)
*G06F 3/01* (2006.01)
(Continued)

(52) U.S. Cl.
CPC ........ *G06T 19/006* (2013.01); *G02B 27/0172* (2013.01); *G06F 3/013* (2013.01);
(Continued)

(58) Field of Classification Search
CPC ... G06T 19/006; G06T 19/20; G02B 27/0172; G02B 27/017; G02B 27/0179; G02B 2027/0138; G02B 2027/014; G06F 3/013; G06F 3/012; G06F 3/017; G06F 3/0482; G06F 3/04845; G06Q 30/0277; G06K 9/00664; H04L 67/42
See application file for complete search history.

(56) References Cited

U.S. PATENT DOCUMENTS

2009/0232354 A1* 9/2009 Camp, Jr. .............. G06Q 30/02
382/103
2012/0122554 A1 5/2012 Paquet et al.
(Continued)

FOREIGN PATENT DOCUMENTS

| | | |
|---|---|---|
| CN | 106933357 A | 7/2017 |
| KR | 20120025211 A | 3/2012 |
| WO | 2018031050 A1 | 2/2018 |

OTHER PUBLICATIONS

Arica, Asena, "BMW Test Drives Snapchat's AR Lenses in Their 3D Car Ad", Retreived from: https://digitalagencynetwork.com/bmw-test-drives-snapchats-ar-lenses-in-their-3d-car-ad/, Nov. 27, 2017, 7 Pages.
(Continued)

*Primary Examiner* — Insa Sadio
*Assistant Examiner* — Saifeldin E Elnafia
(74) *Attorney, Agent, or Firm* — Alleman Hall Creasman & Tuttle LLP

(57) ABSTRACT

A head-mounted display device, including a display, one or more input devices including one or more image sensors, one or more communication devices, and a processor. The processor may output for display a mixed reality experience including one or more virtual objects. The processor may transmit imaging data to a server computing device. The processor may receive, from the server computing device, an identification of a virtual content item display opportunity, which may include a determination that the mixed reality experience and one or more physical features identified from the imaging data satisfy one or more spatial and/or temporal constraints. The processor may transmit a request for one or more virtual content items to the server computing device based on the identification. The processor may receive the one or more virtual content items from the server computing device and may output the one or more virtual content items for display.

13 Claims, 12 Drawing Sheets

(51) Int. Cl.
  *G06Q 30/0241* (2023.01)
  *G02B 27/01* (2006.01)
  *G06F 3/0482* (2013.01)
  *G06F 3/04845* (2022.01)
  *G06V 20/10* (2022.01)
  *H04L 67/01* (2022.01)
  *G06T 19/20* (2011.01)

(52) U.S. Cl.
  CPC ......... *G06F 3/017* (2013.01); *G06Q 30/0277* (2013.01); *G02B 27/017* (2013.01); *G02B 27/0179* (2013.01); *G02B 2027/014* (2013.01); *G02B 2027/0138* (2013.01); *G06F 3/012* (2013.01); *G06F 3/0482* (2013.01); *G06F 3/04845* (2013.01); *G06T 19/20* (2013.01); *G06V 20/10* (2022.01); *H04L 67/01* (2022.05)

(56) References Cited

U.S. PATENT DOCUMENTS

| | | |
|---|---|---|
| 2012/0229909 A1 | 9/2012 | Clavin et al. |
| 2013/0124311 A1* | 5/2013 | Sivanandan ........... G06Q 30/02 705/14.51 |
| 2013/0124326 A1 | 5/2013 | Huang et al. |
| 2013/0293530 A1* | 11/2013 | Perez ................ G06Q 30/0251 345/418 |
| 2016/0155270 A1* | 6/2016 | Poulos ................ G02B 27/017 345/633 |
| 2016/0379408 A1* | 12/2016 | Wright .................. G06F 3/013 345/633 |
| 2017/0169610 A1* | 6/2017 | King ...................... H04N 7/157 |
| 2017/0287007 A1 | 10/2017 | Du |
| 2018/0190003 A1* | 7/2018 | Upadhyay ............. G06T 15/005 |
| 2018/0217429 A1 | 8/2018 | Busch |

OTHER PUBLICATIONS

"Application as Filed in U.S. Appl. No. 16/121,901", filed Sep. 5, 2018, 411 Pages.

"International Search Report & Written Opinion issued in PCT Application No. PCT/US19/060166", dated Apr. 24, 2020, 15 Pages.

"Office Action Issued in European Patent Application No. 19836003.4", dated Jan. 31, 2023, 7 Pages.

"Office Action Issued in European Patent Application No. 19836003.4", dated Sep. 15, 2023, 5 Pages.

* cited by examiner

VIRTUAL CONTENT DISPLAY OPPORTUNITY IN MIXED REALITY

BACKGROUND

In a typical mixed reality system, a user wears a head mounted device equipped with a see-through display that displays holograms superimposed over the user's view of the real world. The holograms can represent information that augment the user's experience of the real-world environment. Holograms may be "screen-locked" to appear in a fixed position relative to the display, or "world-locked" to appear in a fixed position relative to the real world environment. Unlike conventional two dimensional computer displays which display content within the confines of the two dimensional display, in a mixed reality application content can be displayed at any location within the three dimensional environment. Further, a user may freely change their position and viewpoint when walking through the environment. Thus, the world-locked holograms visible to the user at any given time are dependent on the user's movement and gaze orientation and the world-locked location of the holograms. This presents a challenge to third party content providers who desire to place content within such mixed reality environments for viewing by users. Without proper placement, the third party content may be missed by the user.

SUMMARY

According to one aspect of the present disclosure, a head-mounted display device is provided, including an at least partially see-through display, one or more input devices including one or more image sensors configured to collect imaging data of a physical environment, one or more communication devices, and a processor. The processor may be configured to output for display on the display a mixed reality experience including one or more virtual objects superimposed upon the physical environment. The processor may be further configured to transmit the imaging data to a server computing device via the one or more communication devices. The processor may be further configured to receive, from the server computing device, an identification of a virtual content item display opportunity. The identification of the virtual content item display opportunity may include a determination that the mixed reality experience and one or more physical features identified from the imaging data satisfy one or more spatial and/or temporal constraints. The processor may be further configured to transmit a request for one or more virtual content items to the server computing device based on the identification of the virtual content item display opportunity. The processor may be further configured to receive the one or more virtual content items from the server computing device. The processor may be further configured to output the one or more virtual content items for display on the display at one or more respective dynamically positioned content locations in the physical environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventor of the subject application has recognized that existing systems and methods for presenting content such as digital advertisements on two dimensional screens are not suitable for three dimensional mixed reality environments. According to existing systems and methods, digital advertisements are typically presented as banner advertisements on webpages, or alternatively as videos. Banner advertisements are presented in a fixed location on a two dimensional screen that is being viewed by a user, however in mixed reality environments the user is free to look in any direction when interacting with the environment so there is no guarantee that a user will be looking in the direction of content such as an advertisement when it is displayed. In addition, banner advertisements are typically visible to users for brief periods of time. However, users of a mixed reality systems frequently interact with the mixed reality environments for longer periods of time in comparison to non-mixed-reality webpages and videos. Thus, a rate at which the users view new advertisements may be lower than would be desirable when methods of displaying banner advertisements on webpages and in videos are applied to mixed reality environments. In addition, banner advertisements may obstruct users' views of mixed reality environments and make it more difficult for the users to interact with physical and/or virtual objects. This obstruction of the users' views of objects may also occur when existing systems and methods for presenting video advertisements are used.

Figure 1:
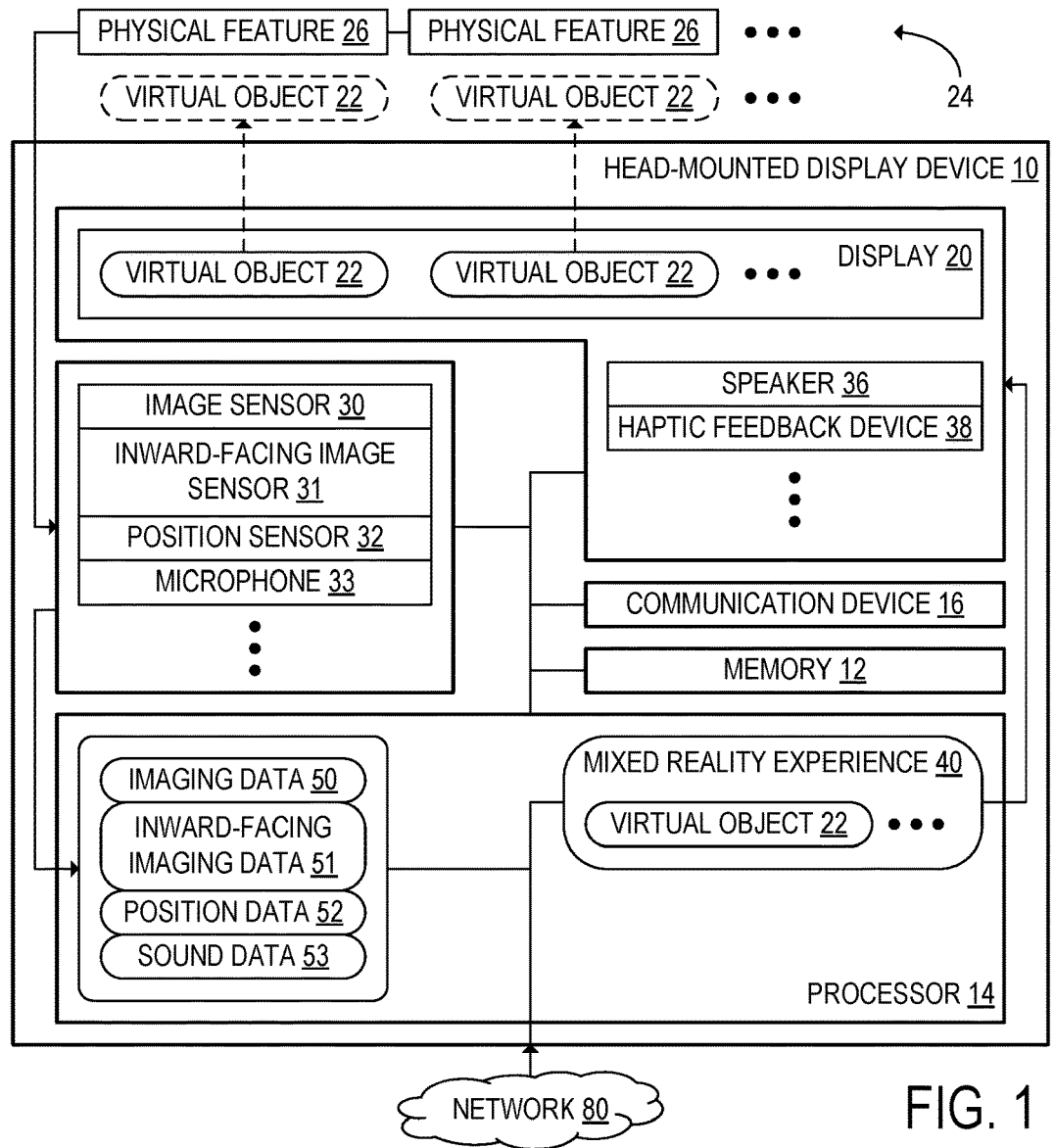
FIG. 1 shows a schematic view of a head-mounted display device, according to one embodiment of the present disclosure.
Figure 1:
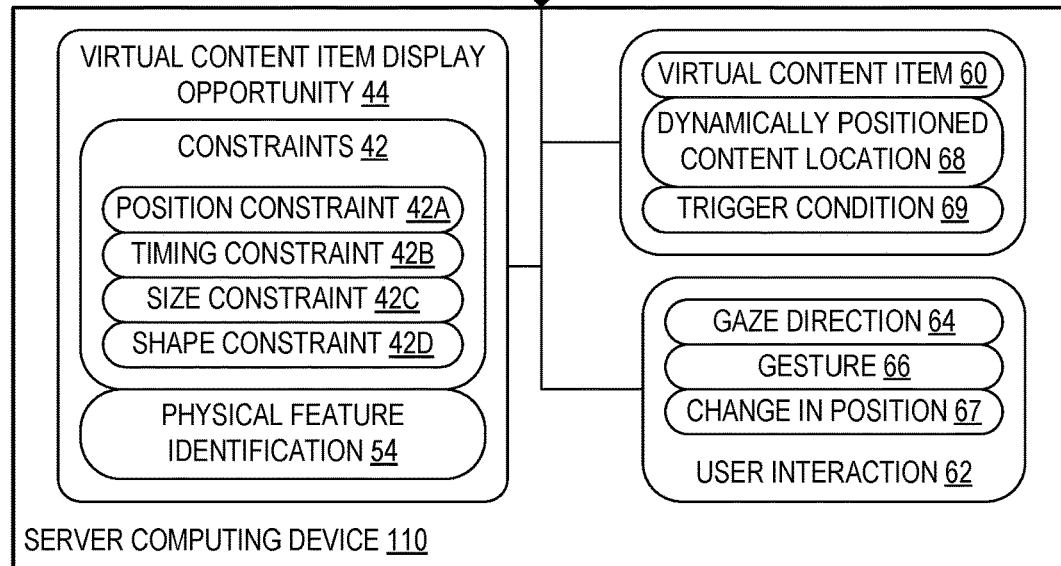

In order to address the problems discussed above, a head-mounted display device 10 is provided, as shown in FIG. 1. The head-mounted display device 10 of FIG. 1 may include memory 12 and/or a processor 14. The memory 12 may include volatile and/or non-volatile memory and may be operatively coupled to the processor 14. The head-mounted display device 10 may further include one or more input devices, which may be included in the head-mounted display device 10 or communicatively coupled to the head-mounted display device 10. The one or more input devices may include one or more image sensors 30 configured to collect imaging data 50 of a physical environment 24. In some embodiments, the one or more input devices may further include an inward-facing image sensor 31 configured to collect inward-facing imaging data 51 of a user. The one or more input devices may further include a position sensor 32 configured to determine a position of the head-mounted display device 10 in the physical environment. In some embodiments, the one or more input devices may further include a microphone 33. One or more other input devices such as a touchscreen, a trackpad, a mouse, a joystick, a keyboard, and/or a button may be included in or communicatively coupled to the head-mounted display device 10 in some embodiments. The head-mounted display device 10 may further include one or more output devices, which may include an at least partially see-through display 20. The one or more output devices may further include one or more of a speaker 36, a haptic feedback device 38, and/or one or more other output devices. The head-mounted display device 10 may further include one or more communication devices 16 via which the processor 14 of the head-mounted display device 10 may send data to and/or receive data from one or more other computing devices. This communication may occur over a network 80. The functions of the memory 12 and processor 14 of the head-mounted display device 10 may be performed at least in part by an offboard computing system with which the head-mounted display device 10 communicates via the one or more communication devices 16. In the example of FIG. 1, the offboard computing system is a server computing device 110.

Figure 2:
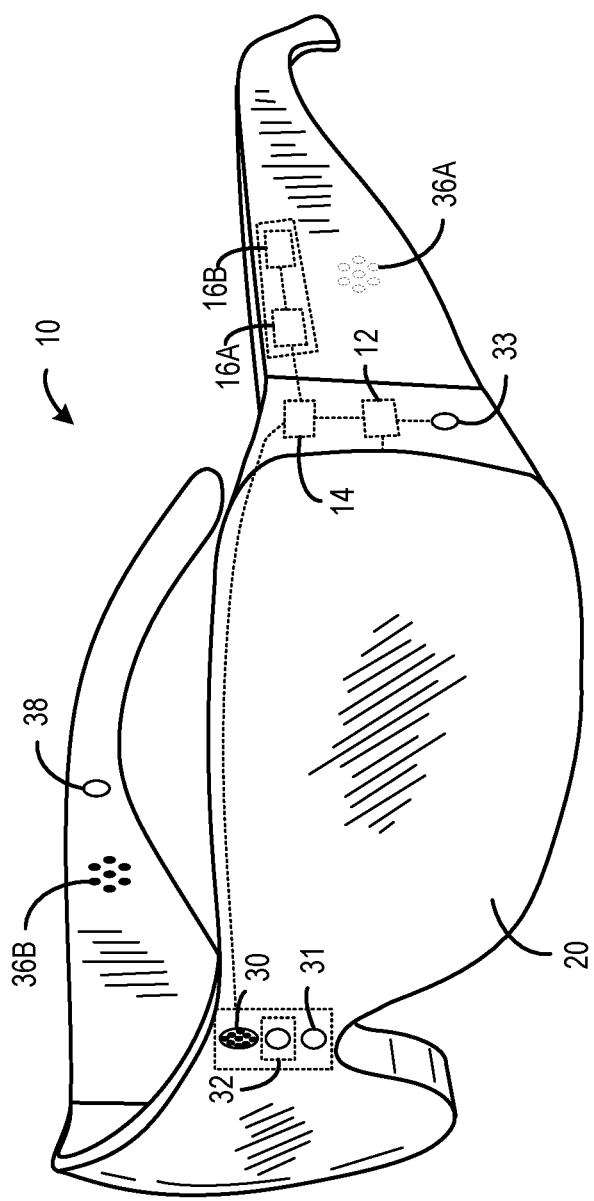
FIG. 2 shows an example embodiment of the head-mounted display device that takes the form of wearable glasses or goggles, according to the embodiment of FIG. 1.

The input and output devices that may be included in the head-mounted display device are discussed in further detail below with reference to FIG. 2. FIG. 2 shows an example embodiment of the head-mounted display device 10 in which the head-mounted display device 10 takes the form of wearable glasses or goggles, but it will be appreciated that other forms are possible. The head-mounted display device 10 may include an output device suite including a display 20. In some embodiments, the head-mounted display device 10 may be configured in an augmented reality configuration to present an augmented reality environment, and thus the display 20 may be an at least partially see-through stereoscopic display configured to visually augment an appearance of a physical environment 24 being viewed by the user through the display 20. In some examples, the display 20 may include one or more regions that are transparent (e.g. optically clear) and may include one or more regions that are opaque or semi-transparent. In other examples, the display 20 may be transparent (e.g. optically clear) across an entire usable display surface of the display 20.

The output device suite of the head-mounted display device 10 may, for example, include an image production system that is configured to display one or more virtual objects 22 to the user with the display 20. The processor 14 may be configured to output for display on the display 20 a mixed reality experience 40 including one or more virtual objects 22 superimposed upon the physical environment 24. In the augmented reality configuration with an at least partially see-through display, the virtual objects 22 are visually superimposed onto the physical environment 24 that is visible through the display 20 so as to be perceived at various depths and locations. In one embodiment, the head-mounted display device 10 may use stereoscopy to visually place a virtual object 22 at a desired depth by displaying separate images of the virtual object 22 to both of the user's eyes. Using this stereoscopy technique, the head-mounted display device 10 may control the displayed images of the virtual objects 22, such that the user will perceive that the virtual objects 22 exist at a desired depth and location in the viewed physical environment 24.

The output device suite of the head-mounted display device 10 may further include one or more speakers 36 configured to emit sound. In some embodiments, the head-mounted display device 10 may include at least a left speaker 36A and a right speaker 36B situated such that the left speaker 36A may be located proximate the user's left ear and the right speaker 36B may be located proximate the user's right ear when the head-mounted display device 10 is worn. Thus, the one or more speakers 36 may emit stereo sound output. The output device suite may further include one or more haptic feedback devices 38 configured to provide tactile output (e.g. vibration).

The head-mounted display device 10 may include an input device suite including one or more input devices. The input device suite of the head-mounted display device 10 may include one or more imaging sensors. In one example, the input device suite includes an outward-facing optical sensor 30 that may be configured to detect the real-world background from a similar vantage point (e.g., line of sight) as observed by the user through the display 20 in an augmented reality configuration. The input device suite may additionally include an inward-facing optical sensor 31 that may be configured to detect a gaze direction of the user's eyes. It will be appreciated that the outward facing optical sensor 30 and/or the inward-facing optical sensor 31 may include one or more component sensors, including an RGB camera and a depth camera. The RGB camera may be a high definition camera or have another resolution. The depth camera may be configured to project non-visible light and capture reflections of the projected light, and based thereon, generate an image comprised of measured depth data for each pixel in the image. This depth data may be combined with color information from the image captured by the RGB camera, into a single image representation including both color data and depth data, if desired.

The input device suite of the head-mounted display device 10 may further include a position sensor system that may include one or more position sensors 32 such as accelerometer(s), gyroscope(s), magnetometer(s), global positioning system(s), multilateration tracker(s), and/or other sensors that output position data 52 as a position, orientation, and/or movement of the relevant sensor. The input device suite may further include one or more microphones 33 configured to collect sound data 53.

Optical sensor information received from the one or more imaging sensors and/or position data 52 received from position sensors 32 may be used to assess a position and orientation of the vantage point of head-mounted display device 10 relative to other environmental objects. In some embodiments, the position and orientation of the vantage point may be characterized with six degrees of freedom (e.g., world-space X, Y, Z, pitch, roll, yaw). The vantage point may be characterized globally or independent of the real-world background. The position and/or orientation may be determined by the processor 14 of the head-mounted display device 10 and/or by an off-board computing system.

Furthermore, the optical sensor information and the position sensor information may be used by the head-mounted display system to perform analysis of the real-world background, such as depth analysis, surface reconstruction, environmental color and lighting analysis, or other suitable operations. In particular, the optical and positional sensor information may be used to create a virtual model of the real-world background. In some embodiments, the position and orientation of the vantage point may be characterized relative to this virtual space. Moreover, the virtual model may be used to determine positions of virtual objects 22 in the virtual space and add additional virtual objects 22 to be displayed to the user at a desired depth and location. The virtual model is a three-dimensional model and may be referred to as "world space," and may be contrasted with the projection of world space viewable on the display 20, which is referred to as "screen space." Additionally, the optical sensor information received from the one or more image sensors 30 may be used to identify and track objects in the field of view of the one or more image sensors 30. The optical sensors may also be used to identify machine recognizable visual features in the physical environment 24 and use the relative movement of those features in successive frames to compute a frame to frame relative pose change for the head mounted display device 10 within the world space of the virtual model.

The head-mounted display device 10 may further include a communication system including one or more communication devices 16, which may include one or more receivers 16A and/or one or more transmitters 16B. In embodiments in which the head-mounted display device 10 communicates with an off-board computing system, the one or more receivers 16A may be configured to receive data from the off-board computing system, and the one or more transmitters 16B may be configured to send data to the off-board computing system. In some embodiments, the head-mounted display device 10 may communicate with the off-board computing system via a network, which may be a wireless local- or wide-area network. Additionally or alternatively, the head-mounted display device 10 may communicate with the off-board computing system via a wired connection. The head-mounted display device 10 may be further configured to communicate with a server computing system via the communication system.

Returning to FIG. 1, the processor 14 may be further configured to transmit the imaging data 50 to a server computing device 110 via the one or more communication devices such that the server computing device 110 may identify one or more physical features 26 in the physical environment 24 based on the imaging data 50. In other embodiments, identification of the one or more physical features 50 may be performed at least in part at the processor 14 of the head-mounted display device 10. In some embodiments, the one or more physical feature identifications 54 may be made using a machine learning algorithm. The physical environment 24 may be developed based on the one or more physical feature identifications 54 of the one or more physical features 26. The virtual model may include one or more geometric features of each of the one or more physical features 26.

In embodiments in which the one or more input devices of the head-mounted display device 10 further include an inward-facing image sensor 31 configured to collect inward-facing imaging data 51 of the user, the processor 14 may be further configured to transmit the inward-facing imaging data to the server computing device 110. Additionally or alternatively, in embodiments in which the one or more input devices of the head-mounted display device 10 include one or more position sensors 32 and/or one or more microphones 33, the processor 14 may be further configured to transmit position data 52 received from the one or more position sensor 32 and/or sound data 53 received from the one or more microphones 33 respectively to the server computing device 110. In such embodiments, the processor 14 may be further configured to receive, from the server computing device 110, a determination of a gaze direction 64 of the user based on the inward-facing imaging data 51. In other embodiments, the gaze direction 64 may be determined at the processor 14. The gaze direction 64 may be correlated with the position and orientation of the head-mounted display device 10 itself as determined using position data 52 and imaging data 50. In embodiments in which position data 32 is transmitted to the server computing device, the processor 14 may be further configured to receive an indication of a change in position 67 from the server computing device 110.

As discussed above, the mixed reality experience 40 may include one or more virtual objects 22 superimposed upon the physical environment 24. The one or more virtual objects 22 may be received from the server computing device 110. The processor 14 and/or the server computing device 110 may be configured to modify the one or more virtual objects 22 included in the mixed reality experience 40 over time according to rules specified by the mixed reality experience 40. For example, the mixed reality experience 40 may include a physics engine configured to model responses of the one or more virtual objects 22 to features of the physical environment 24 and/or events occurring in the physical environment 24. The physics engine may additionally or alternatively model interactions of the one or more virtual objects 22 with each other. The processor 14 may be further configured to modify the one or more virtual objects 22 based on user input received from the one or more input devices. Thus, the mixed reality experience 40 may be an interactive experience.

Based on the mixed reality experience 40 and/or the identification 54 of the one or more physical features 26 in the physical environment 24, the server computing device 110 may be further configured to identify a virtual content item display opportunity 44. The virtual content item display opportunity 44 may be a set of conditions in the physical environment 24 and/or the mixed reality experience 40 that are conducive to displaying a virtual content item 60 on the display 20 of the head-mounted display device 10. In some embodiments, the server computing device 110 may be configured to identify the virtual content item display opportunity 44 at least in part by determining that the one or more identified physical features 26 have a predetermined set of geometric characteristics. For example, in an embodiment in which the virtual content item 60 is a virtual poster, the virtual content item display opportunity 44 may occur when a substantially flat and vertical surface of sufficient size to accommodate the virtual poster is determined to be present in the physical environment 24. As another example, in an embodiment in which the virtual content item 60 is a virtual vehicle, the virtual content item display opportunity 44 may occur when a road is determined to be present in the physical environment 24.

The server computing device 110 may be configured to identify the virtual content item display opportunity 44 at least in part by determining that the one or more identified physical features 26 satisfy one or more spatial and/or temporal constraints 42. The one or more spatial and/or temporal constraints 42 may include one or more position constraints 42A on respective positions at which the one or more virtual content items 60 may be displayed. The one or more position constraints 42A may specify, for each virtual content item 60, a subset of the physical environment 24 within which the virtual content item 60 is eligible to be displayed. For example, the one or more position constraints 42A may specify that a virtual content item 60 may be displayed at one or more locations that do not overlap a preexisting virtual object 22 or physical feature 26. Additionally or alternatively, the one or more spatial and/or temporal constraints 42 may include one or more timing constraints 42B on respective times at which the one or more virtual content items 60 may be displayed. For example, the server computing device 110 may determine based on the mixed reality experience 40 that the user is engaged in an activity (e.g. a video call) that would be undesirable to interrupt. As another example, the timing constraint 42B may specify a maximum duration for which the virtual content item 60 may be displayed. The one or more constraints may further include one or more size constraints 42C on respective sizes of the one or more virtual content items 60 and/or one or more shape constraints 42D on respective shapes of the one or more virtual content items 60. The one or more size constraints 42C and the one or more shape constraints 42D may, for example, specify that a virtual content item 60 may be displayed at one or more surfaces or volumes that can accommodate the virtual content item 60 without the virtual content item 60 overlapping one or more virtual objects 22 and/or physical features 26. Other constraints 42 may additionally or alternatively be applied when identifying virtual content display opportunities 44.

Figure 3A:
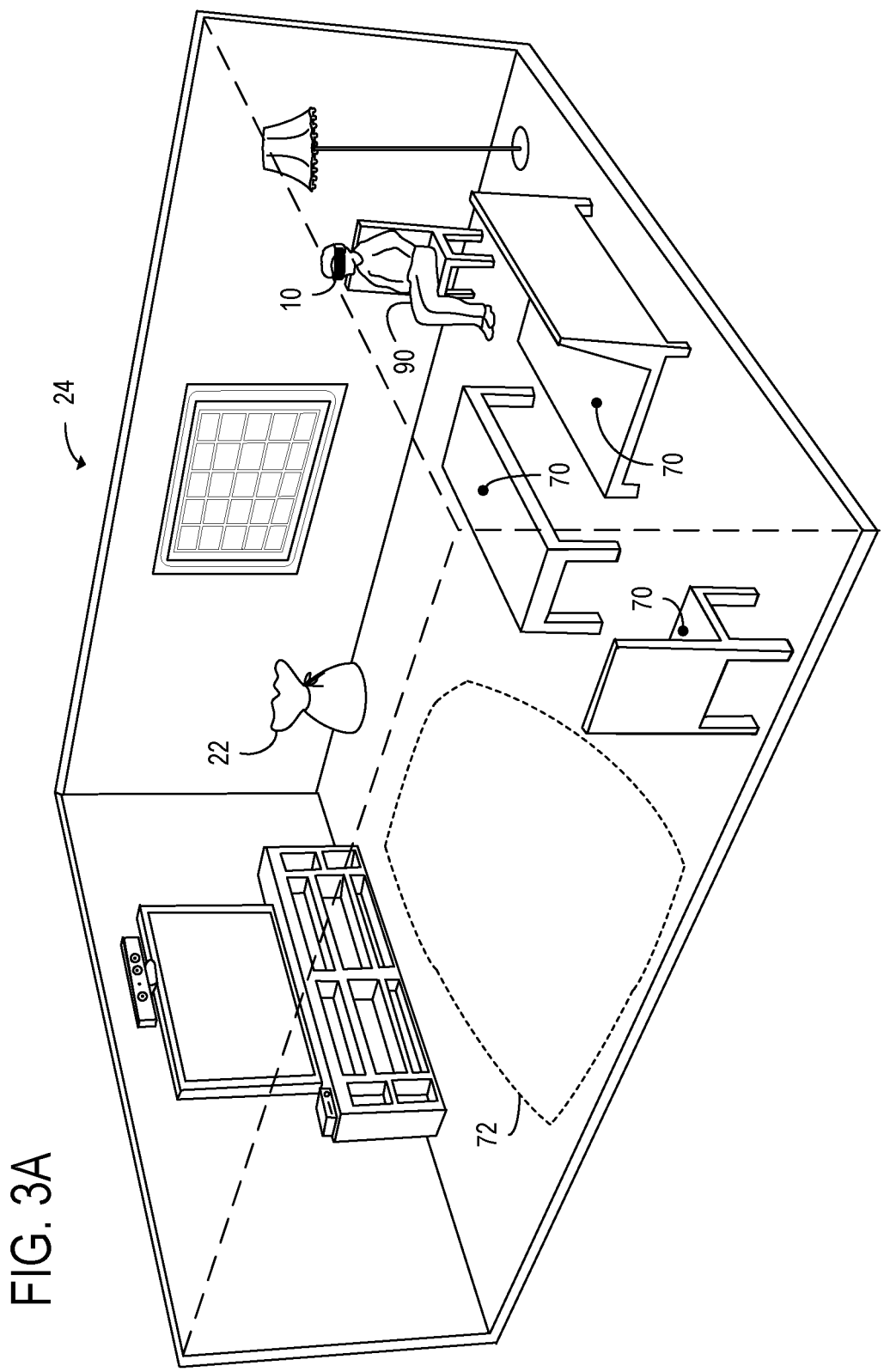
FIG. 3A-B shows an example physical environment including a plurality of candidate locations for displaying a virtual content item, according to the embodiment of FIG. 1.

When the server computing device 110 determines that a virtual content item display opportunity 44 occurs, the server computing device 110 may identify one or more candidate locations at which the virtual content item 60 may be displayed in the physical environment 24. Example candidate locations 70 in the physical environment 24 are shown in FIG. 3A according to one example embodiment. The candidate locations 70 may be locations at which the virtual content item 60 is anchored. In the example of FIG. 3A, the candidate locations 70 are all located on substantially flat horizontal surfaces. However, in other embodiments, one or more candidate locations on vertical surfaces or surfaces of other shapes may be identified. One or more candidate locations may additionally or alternatively be floating candidate locations positioned apart from surfaces in the physical environment 24. FIG. 3A also shows an example candidate area 72. The virtual content item 60 may be anchored at any point within the candidate area 72. In other embodiments, one or more candidate lines and/or candidate volumes may be identified along which or within which a virtual object may be displayed.

In response to receiving the identification of the virtual content item display opportunity 44, the processor 14 may be further configured to transmit a request for one or more virtual content items 60 to the server computing device 110 based on the identification of the virtual content item display opportunity 44. After sending the request, the processor 14 may receive the one or more virtual content items 60 from the server computing device 110. The request sent from the head-mounted display device 10 to the server computing device 110 and the response sent from the server computing device 110 to the head-mounted display device are discussed in further detail below with reference to FIG. 8.

Figure 3B:
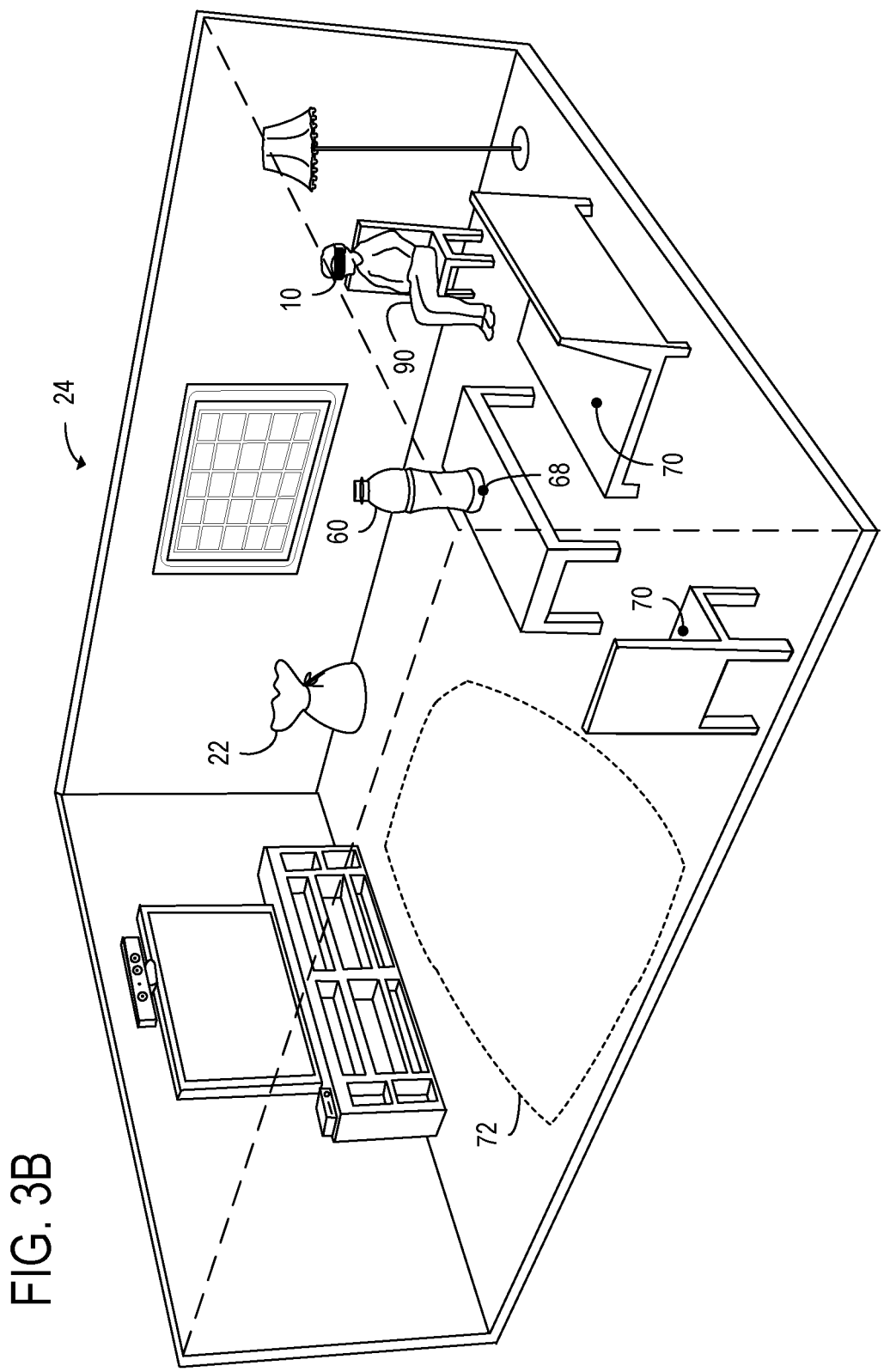

After receiving the one or more virtual content items 60, the processor 14 may be further configured to output the one or more virtual content items 60 for display on the display 20 based on the identification of the virtual content item display opportunity 44, as shown in FIG. 3B. Each virtual content item 60 may be displayed at a respective dynamically positioned content location 68 in the physical environment 24 selected from among the one or more candidate locations 70 by the server computing device 110. The server computing device 110 may apply one or more rules and/or heuristics to determine a candidate location 70 of the one or more candidate locations 70 at which to display the virtual content item 60. In one example, the server computing device 110 may assign a score to each candidate location 70 and select the candidate location 70 that has the highest score. The score of a candidate location 70 may be based on one or more properties of the candidate location 70 such as distance from the user 90, angular displacement from the gaze direction 64, proximity to one or more virtual objects 22, size of a candidate area 72, user-specified preferences, one or more physical feature identifications 54, and/or one or more other scoring criteria. In some embodiments, the score may be a weighted score expressed as a sum of a plurality of scoring criteria with respective weights. In the example of FIG. 3B, the virtual content item 60, which depicts a soft drink bottle, is displayed at the candidate location 70 closest to the user 90.

Figure 4:
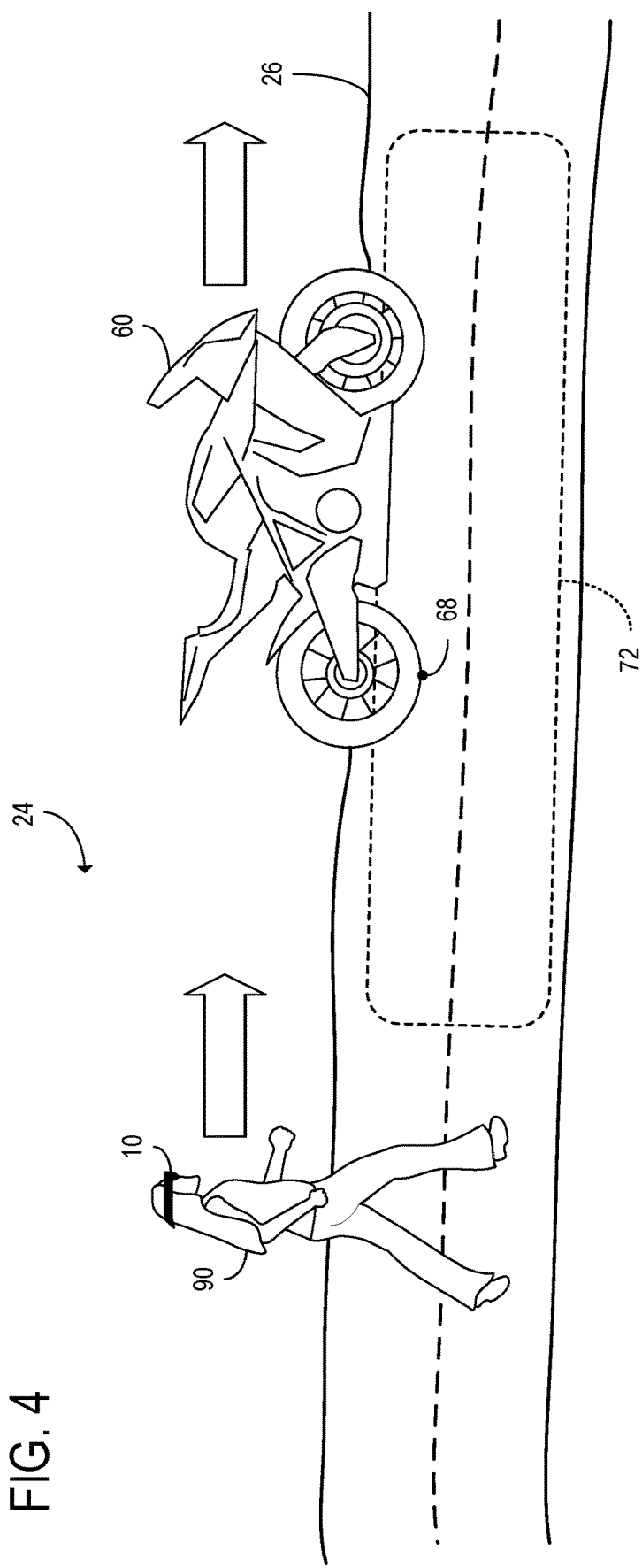
FIG. 4 shows an example physical environment in which a virtual content item is displayed, according to the embodiment of FIG. 1.

In some embodiments, the virtual content item display opportunity 44 may occur when an event or activity other than a physical feature 26 detected with the image sensor 30 is present in the physical environment 24 or the mixed reality experience 40. For example as shown in FIG. 4, the server computing device 110 may determine based on the imaging data 50 and/or position data 52 received from the position sensor 32 that a user 90 is running. The virtual content item display opportunity 44 may include a physical feature identification 54 in addition to an event or activity identification in some embodiments. For example, the server computing device 110 may further determine that the physical feature identification 54 includes an identification of a road. In response to this determination, the server computing device 110 may determine that a virtual content item display opportunity 44 exists for a virtual content item 60 depicting a motorcycle driving alongside the user 90. In response to receiving the virtual content item display opportunity 44 including this determination, the processor 14 may be further configured to output the virtual content item 60 for display on the display 20. The virtual content item 60 may be output for display at a dynamically positioned content location 68 in the physical environment 24, which may be located within a candidate area 72. The dynamically positioned content location 68 may move as the user 90 moves through the physical environment 24 so that the virtual content item 60 remains near the user. For example, the dynamically positioned content location 68 may remain within a predetermined threshold distance of the user 90. The dynamically positioned content location 68 may be anchored to a physical feature 26 in the physical environment 24 such that the virtual content item 60 remains located on, or at a predetermined offset from, the physical feature 26. In the embodiment of FIG. 4, the physical feature 26 to which the virtual content item 60 is anchored is the road.

In some embodiments, the processor 14 may not output the virtual content item 60 to the display 20 for display immediately upon receiving the virtual content item 60 from the server computing device 110. Instead, the processor 14 may wait for a trigger condition 69 to occur before the virtual content item 60 is displayed. For example, the processor 14 may display the virtual content item 60 after a predetermined period of time has elapsed. In other embodiments, the trigger condition 69 may be an event that occurs in the physical environment 24 or the mixed reality experience 40, such as a video ending.

Returning to FIG. 1, the processor 14 may be further configured to receive, via the one or more input devices, a user interaction 62 with a virtual content item 60 of the one or more virtual content items 60. The server computing device 110 may determine that the data received from the one or more input devices of the head-mounted display device 10 includes a user interaction 62. In some embodiments, the user interaction 62 may include a gesture selecting the virtual content item 60. Additionally or alternatively, in embodiments in which the processor is configured to determine a gaze direction 64 of the user 90, the user interaction 62 may include gazing at the virtual content item 60. The user interaction 62 may additionally or alternatively include a change in the position of the head-mounted display device 10 as detected by the position sensor 32, a voice input as detected by the microphone 33, and/or some other type of input. The user interaction 62 may include inputs from a plurality of input devices. Any of the input devices discussed above with reference to FIGS. 1 and 2 may be used, alone or in combination, to provide the user interaction 62.

In some embodiments, the processor 14 may be further configured to modify at least one virtual object 22 in response to the user interaction 62. The at least one virtual object 22 modified in response to the user interaction 62 may be the virtual content item 60. Additionally or alternatively, the modified virtual object 22 may be another virtual object 22 included in the mixed reality experience 40. For example, the user 90 may select an option to display additional information (e.g. by navigating to a webpage, rotating the virtual content item 60, or expanding a collapsed graphical element). As another example, the user 90 may select an option to dismiss the virtual content item 60.

In some embodiments, the processor 14 may be further configured to transmit an indication of the user interaction 62 to the server computing device 110 via the one or more communication devices 16. This indication may be transmitted over the network 80. Alternatively, the processor 14 may be configured to transmit sensor data to the server computing device 110, which may determine that the sensor data indicates a user interaction 62. In response to sending the sensor data or the indication of the user interaction 62, the head-mounted display device 10 may receive additional data from the server computing device 110, such as one or more assets included in a webpage. The additional data may encode the updated virtual object. Additionally or alternatively, the indication of the user interaction 62 may be transmitted to the server computing device 110 without the head-mounted display device 10 receiving additional data in response. For example, in some embodiments, the one or more virtual content items 60 may include one or more advertisements. In such embodiments, the server computing device 110 may collect data on rates and types of user interaction 62 with the one or more advertisements.

The one or more virtual content items 60 may be configured to interact with the one or more virtual objects 22 of the mixed reality experience 40. In such interactions, the one or more virtual content items 60 may be modified based on one or more properties of the one or more virtual objects 22. Additionally or alternatively, the one or more virtual objects 22 may be modified based on one or more properties of the one or more virtual content items 60. In embodiments in which movement of the one or more virtual objects is governed by a physics engine included in the mixed reality experience 40, the physics engine may also control movement of the one or more virtual content items 60. For example, a virtual object 22 and a virtual content item 60 may collide and bounce off each other. As another example, the user 90 may select a portion of the virtual content item 60 by manipulating a virtual object 22 that acts as a virtual cursor. Thus, the virtual content item 60 may be incorporated into the mixed reality experience in a way that leads to less of an interruption in the mixed reality experience 40 than existing systems and methods for introducing virtual content items 60 into mixed reality experiences 40. In addition, when a plurality of virtual content items 60 are displayed, each of the virtual content items 60 may interact with any or all of the other virtual content items 60 and/or the virtual objects 22. Thus, a plurality of virtual content items 60 may be concurrently integrated into the mixed reality experience 40.

Figure 5A:
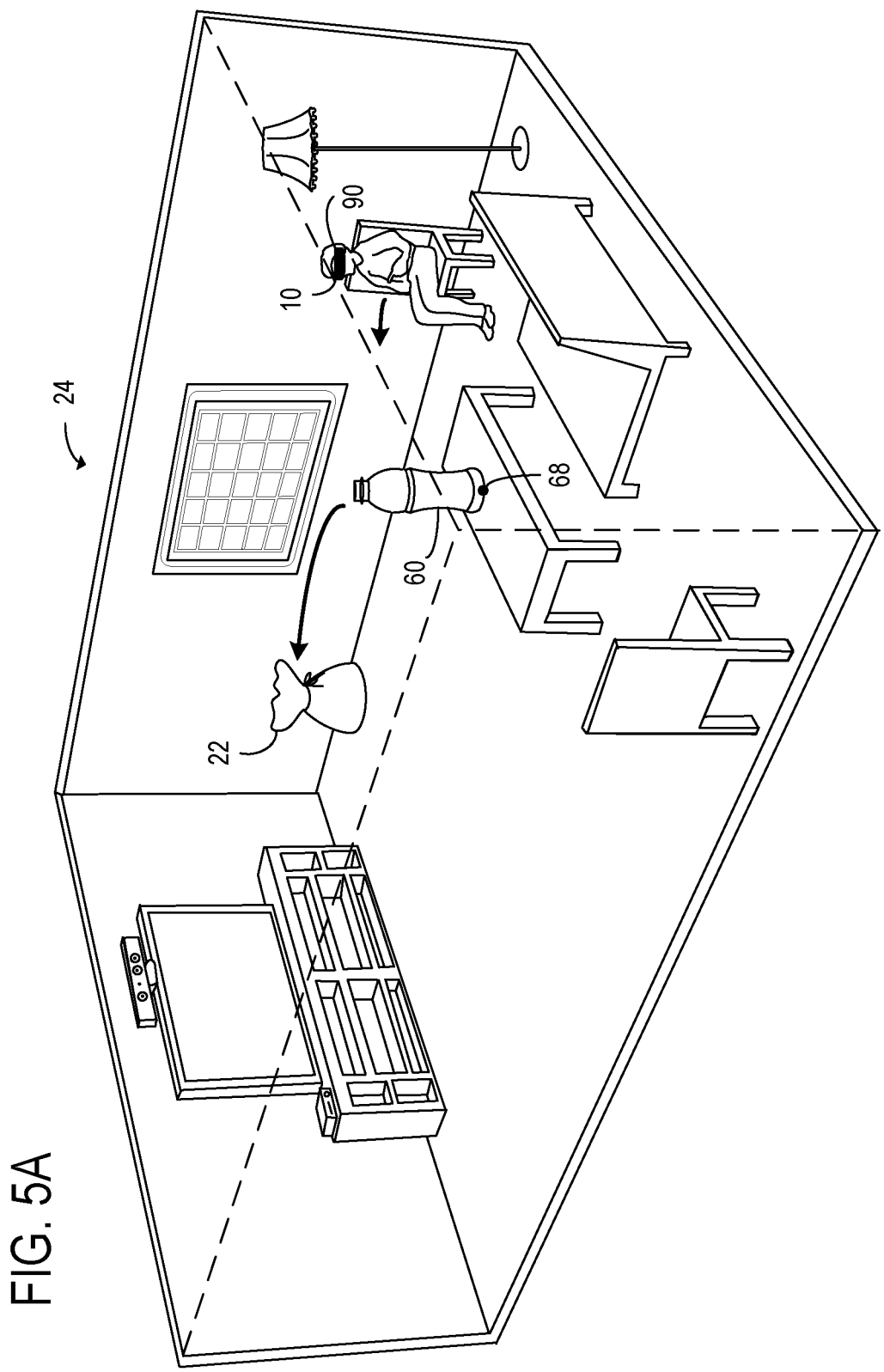
FIGS. 5A-B show the example physical environment of FIGS. 3A-B in an example in which a user interacts with the virtual content item.
Figure 5B:
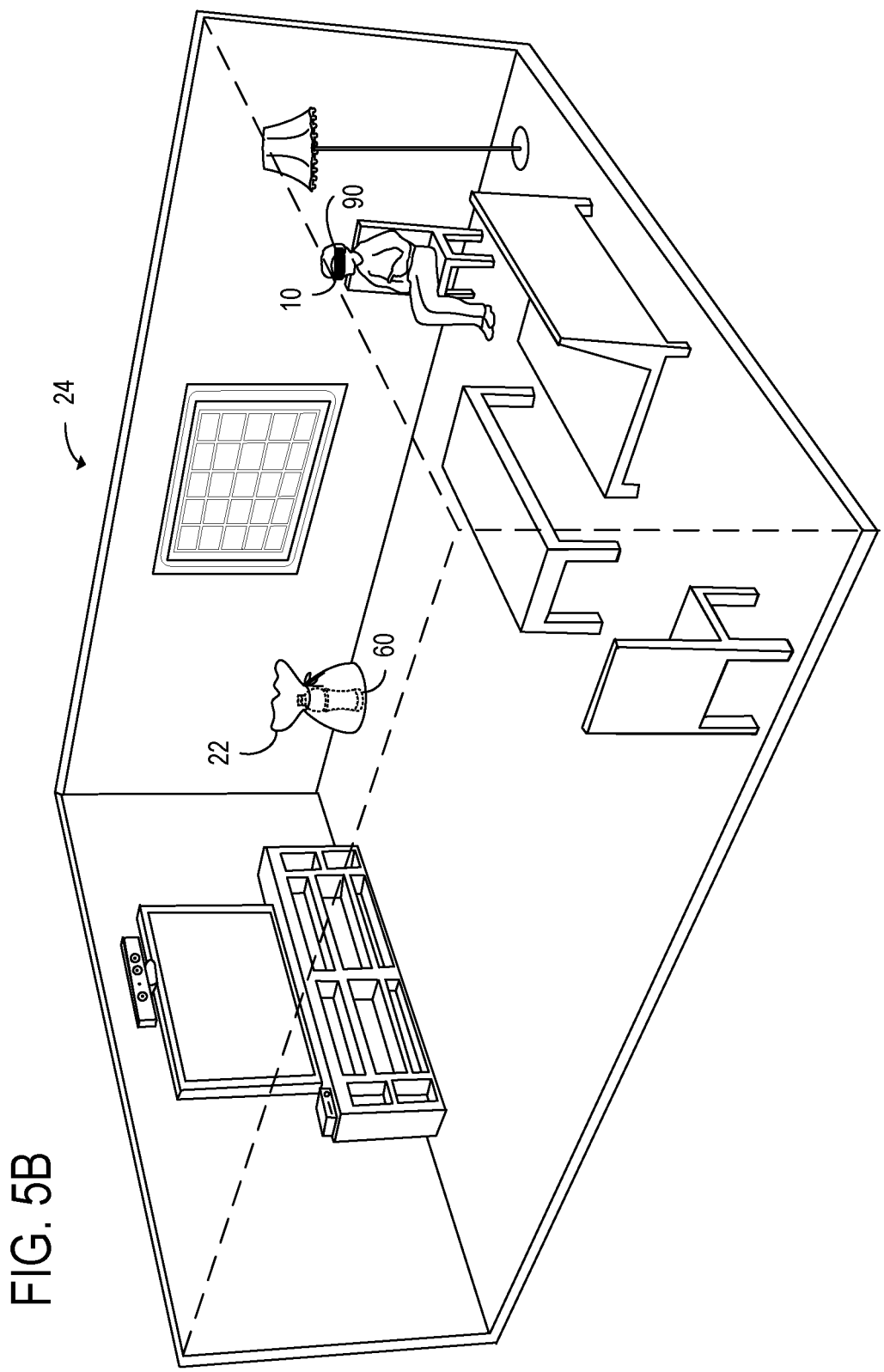

FIGS. 5A-B show the physical environment 24, virtual object 22, and virtual content item 60 of FIGS. 3A-B in an example of an interaction between the virtual object 22 and the virtual content item 60. In the example of FIGS. 5A-B, the processor 14 of the head-mounted display device 10 receives imaging data 50 from the one or more imaging sensors 30 and transmits the imaging data 50 to the server computing device 110. The processor 14 then receives, from the server computing device 10, an indication of a user interaction 62 including a gesture 66. The gesture 66 is a gesture to select the virtual content item 60 and move the virtual content item 60 toward the virtual object 22, which represents a bag. In response to this gesture 66, the processor 14 may modify the dynamically located position 68 of the virtual content item 60 and cause the bottle (virtual content item 60) to appear to be placed inside the bag (virtual object 22). Thus, the virtual object 22 may interact with the virtual content item 60 such that the virtual content item 60 is hidden. In the example of FIGS. 5A-B, the user interaction 62 placing the bottle (virtual content item 60) into the bag (virtual object 22) may be an "add to cart" action selecting the soft drink for purchasing.

Figure 6:
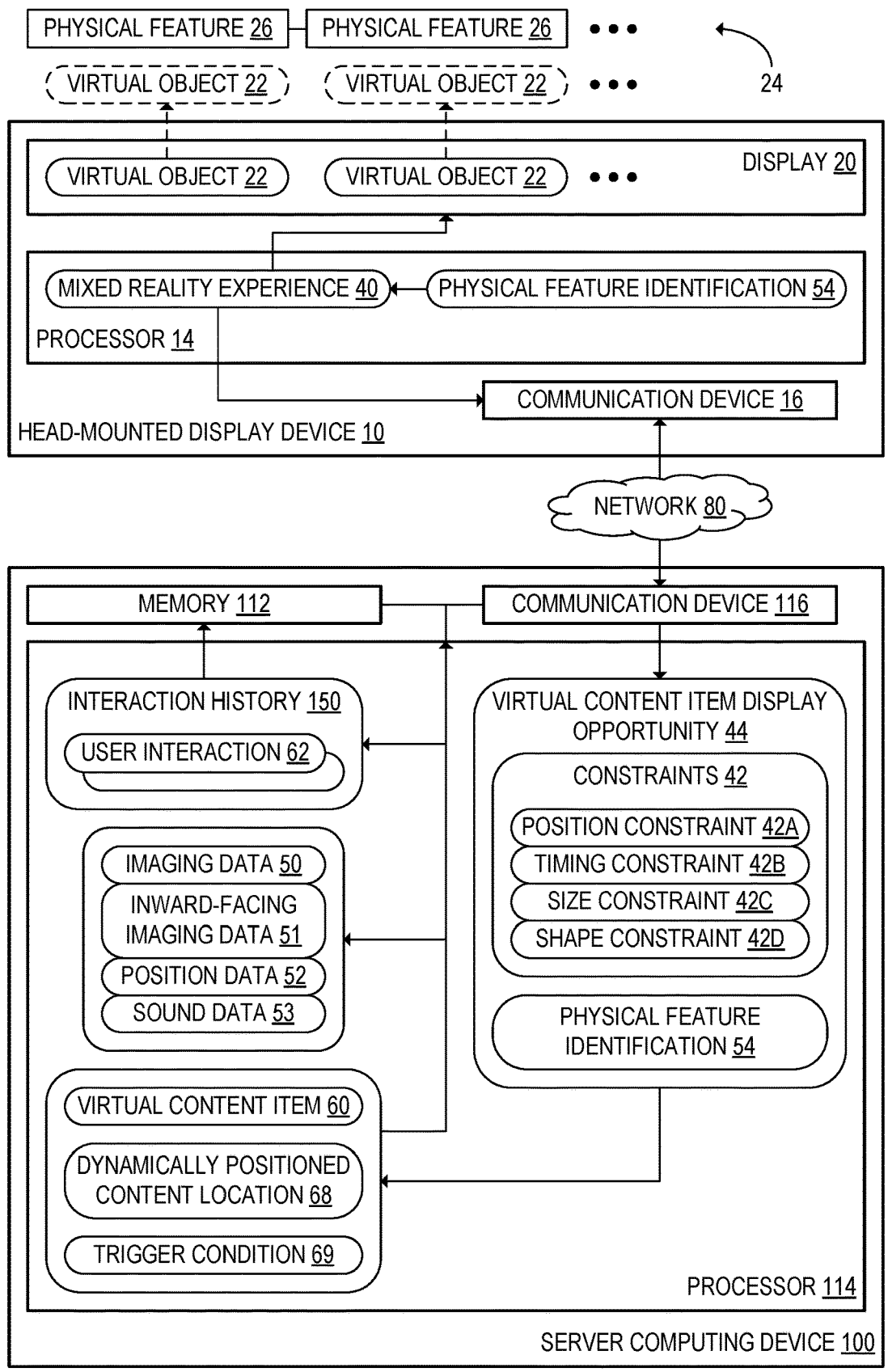
FIG. 6 shows a schematic view of a server computing device, according to the embodiment of FIG. 1.

The server computing device 110 is shown in further detail with reference to FIG. 6. The server computing device 110 may include one or more communication devices 116 communicatively coupled to the head-mounted display device 10. The one or more communication devices 116 may be communicatively coupled to the head-mounted display device 10 over the network 80. The server computing device 110 may, in some embodiments, include one or more input devices and/or one or more output devices. The server computing device 110 may further include memory 112, which may include volatile and/or non-volatile memory. The server computing device 110 may further include a processor 114.

The processor 114 of the server computing device 110 may be configured to receive, via the one or more communication devices 116, imaging data 50 from the head-mounted display device 10. The processor 114 of the server computing device 110 may further receive one or more of inward-facing imaging data 51, position data 52, and/or sound data 53 from the head-mounted display device 10. Based on the imaging data 50, the processor 114 of the server computing device 110 may be configured to identify the one or more physical features 26 in the physical environment of the head-mounted display device 10. The one or more physical features 26 may also be identified based on one or more of the inward-facing imaging data 51, the position data 52, the sound data 53, and/or data collected at other input devices of the head-mounted display device 10. The processor 114 may be further configured to identify a virtual content item display opportunity 44. The identification of the virtual content item display opportunity 44 may include a determination that one or more physical features 26 identified at the head-mounted display device 10 satisfy one or more spatial and/or temporal constraints 42. For example, the one or more spatial and/or temporal constraints 42 may include one or more position constraints 42A, timing constraints 42B, size constraints 42C, and/or shape constraints 42D on a virtual content item 60.

The processor 114 of the server computing device 110 may be further configured to select one or more virtual content items 60 from a plurality of virtual content items 60. The plurality of virtual content items 60 may be stored in the memory 112. The one or more virtual content items 60 may be selected based on the one or more constraints 42 included in the indication of the virtual content item display opportunity 44. For example, the plurality of virtual content items 60 may include a first subset of one or more virtual content items 60 that satisfy all the constraints 42 for at least one virtual content item opportunity 44 and a second subset of one or more virtual content items 60 that, for each virtual content item display opportunity identified by the head-mounted display device, do not satisfy at least one constraint. The processor 114 of the server computing device 110 may then select the virtual content item 60 from the first subset.

The processor 114 of the server computing device 110 may be further configured to select one or more respective dynamically positioned content locations 68 at which the one or more virtual content items 60 are configured to be displayed in a physical environment 24 of the head-mounted display device 10. The dynamically positioned content location 68 of a virtual content item 60 may be selected from among a plurality of candidate locations for the virtual content item 60. In some embodiments, the dynamically positioned content location 68 may move over time. The processor 114 may further select one or more respective trigger conditions 69 for the one or more virtual content items 60.

The processor 114 may be further configured to convey the one or more virtual content items 60 to the head-mounted display device 10. The processor 114 may also convey the one or more respective dynamically positioned content locations 68 and/or trigger conditions 69 to the head-mounted display device. The one or more virtual content items 60, the one or more dynamically positioned content locations 68, and/or the one or more trigger conditions 69 may be conveyed to the head-mounted display device over the network 80.

In some embodiments, the processor 114 of the server computing device 110 may be further configured to receive, via the one or more communication devices 116, a user interaction 62 with a virtual content item 60 of the one or more virtual content items 60 from the head-mounted display device 10. For example, the user interaction 62 may indicate that the user 90 has gazed at the virtual content item 60 for a predetermined period of time. As another example, the user interaction 62 may indicate that the user 90 has selected an option to receive additional information from the server computing device 110. In some embodiments, the server computing device 110 may store the indication of the user interaction 62 in interaction history 150. In embodiments in which the virtual content item 60 is an advertisement, data stored in the interaction history 150 may be analyzed to determine the effectiveness of the advertisement. For example, the data stored in the interaction history 150 may be used as training data for a machine learning algorithm.

Figure 7A:
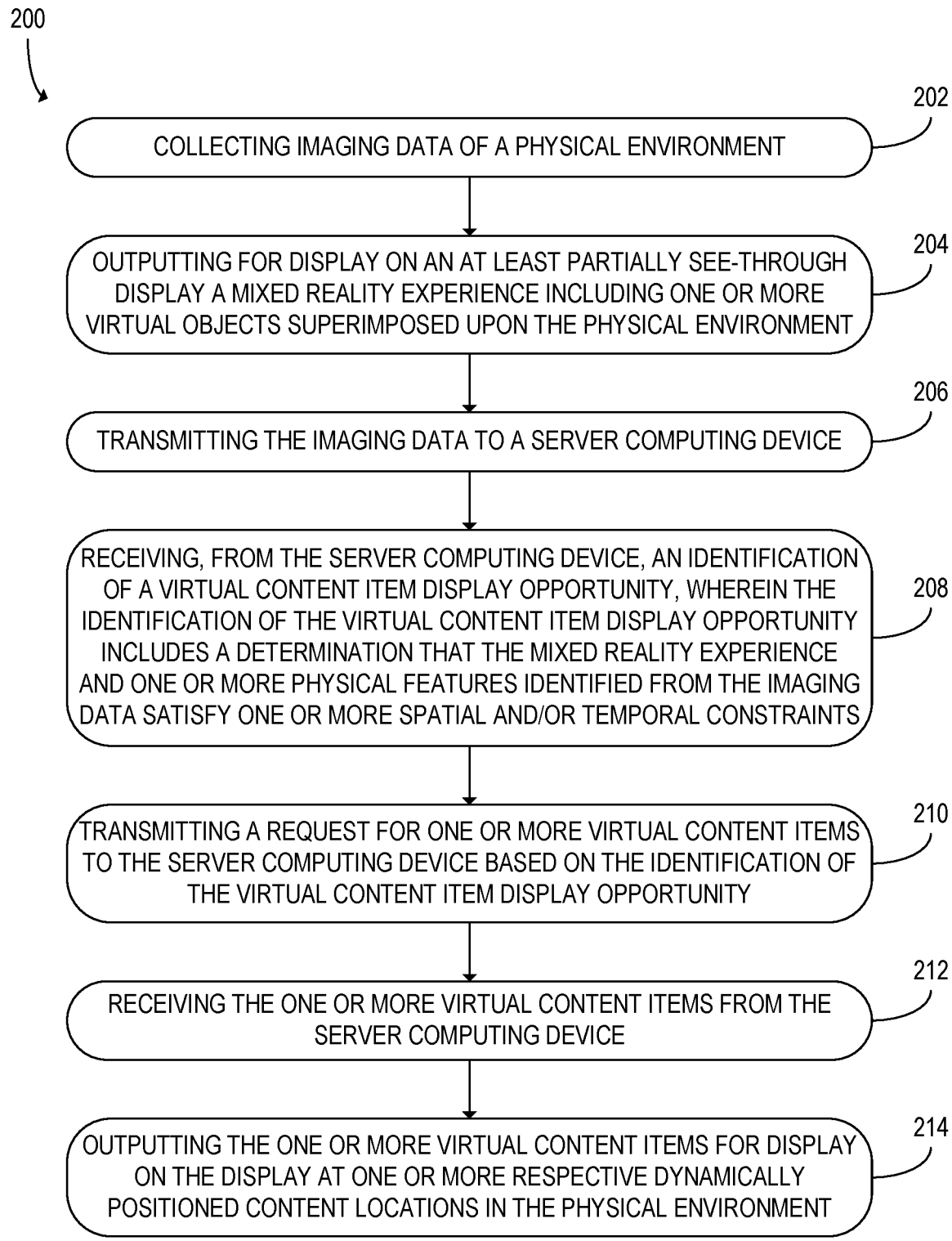
FIG. 7A shows a flowchart of an example method that may be performed at a head-mounted display device, according to the embodiment of FIG. 1.

FIG. 7A shows a flowchart of a method 200 that may be performed at a head-mounted display device. The method 200 may be performed at the head-mounted display device 10 of FIG. 1 or at some other head-mounted display device. At step 202, the method 200 may include collecting imaging data of a physical environment. The imaging data may be collected by one or more outward-facing time-of-flight and/or RGB cameras included in the head-mounted display device. Additionally or alternatively, the imaging data may be collected by another sensor device external to the head-mounted display device and communicated to the head-mounted display device. At step 204, the method 200 may further include outputting a mixed reality experience for display on an at least partially see-through display. The mixed reality experience may include one or more virtual objects superimposed upon the physical environment. Each virtual object superimposed upon the physical environment may be displayed such that it has an apparent location in the physical environment. At step 206, the method 200 may further include transmitting the imaging data to a server computing device. The imaging data may be transmitted to the server computing device via one or more communication devices included in the head-mounted display device.

At step 208, the method 200 may further include receiving, from the server computing device, an identification of a virtual content item display opportunity. The virtual content item display opportunity may include a determination that the one or more physical features identified based on the imaging data satisfy one or more spatial and/or temporal constraints. For example, the one or more spatial and/or temporal constraints may include one or more position constraints on respective positions at which the one or more virtual content items are displayed. The one or more spatial and/or temporal constraints may additionally or alternatively include one or more timing constraints on respective times at which the one or more virtual content items are displayed. The one or more spatial and/or temporal constraints may additionally or alternatively include one or more size constraints on respective sizes of the one or more virtual content items and/or one or more shape constraints on respective shapes of the one or more virtual content items. In some embodiments, the virtual content item display opportunity may be identified at least in part by determining that the one or more identified physical features have a predetermined set of geometric characteristics.

In response to identifying the virtual content item display opportunity, the method 200 may further include, at step 210, transmitting a request for one or more virtual content items to the server computing device based on the identification of the virtual content item display opportunity. At step 212, the method may further include receiving the one or more virtual content items from the server computing device. In some embodiments, additionally or alternatively to contacting a server computing device and receiving the one or more virtual content items from the server device as in steps 210 and 212, the head-mounted display device may access one or more virtual content items stored locally in memory. In such embodiments, the one or more virtual content items may be displayed without contacting a server computing device.

At step 214, the method 200 may further include outputting the one or more virtual content items for display on the display at the one or more respective dynamically positioned content locations in the physical environment. The one or more virtual content items may be output from display based on the identification of the virtual content item display opportunity. For example, the one or more virtual content items may be output for display at respective dynamically positioned content locations that satisfy the one or more spatial and/or temporal constraints. In some embodiments, the one or more virtual content items may be configured to interact with the one or more virtual objects of the mixed reality experience. In such embodiments, the one or more virtual content items may be incorporated into the mixed reality experience as newly added virtual objects rather than forming a separate but concurrent mixed reality experience.

Figure 7B:
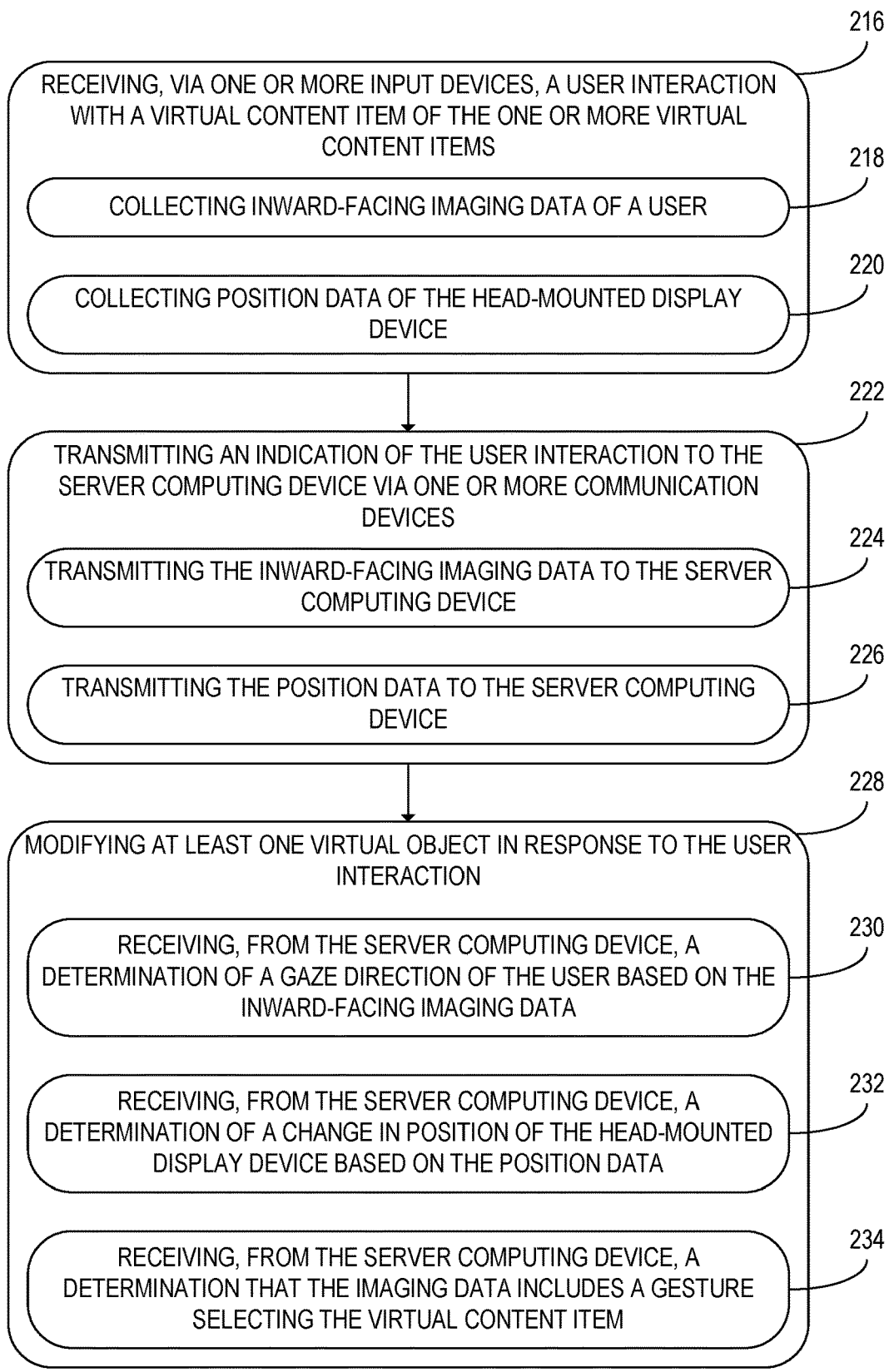
FIG. 7B shows additional steps that may be performed when performing the method of FIG. 7A.

FIG. 7B shows additional steps that may be performed in some embodiments when performing the method 200 of FIG. 7A. At step 216, the method 200 may further include receiving, via one or more input devices, a user interaction with a virtual content item of the one or more virtual content items. The one or more input devices may include one or more input devices included in, and/or external to, the head-mounted display device. In some embodiments, receiving the user interaction may include, at step 218, collecting inward-facing imaging data of a user via an inward-facing camera included in the head-mounted display device. The user interaction may include gazing at the virtual content item. The user interaction may additionally or alternatively include, at step 220, collecting position data of the head-mounted display device.

In some embodiments, at step 222, the method 200 may further include transmitting an indication of the user interaction to the server computing device via one or more communication devices included in the head-mounted display device. In embodiments in which step 218 is performed, step 222 may include, at step 224, transmitting the inward-facing imaging data to the server computing device. In embodiments in which step 220 is performed, step 222 may include, at step 226, transmitting the position data to the server computing device. The server computing device may be the same as or different from the server computing device of steps 210 and 212. The indication of the user interaction may be transmitted to the server computing device over a network.

At step 228, the method 200 may further include modifying at least one virtual object in response to the user interaction. The at least one virtual object modified in response to the user interaction may include at least one virtual content item of the one or more virtual content items, and/or at least one other virtual object included in the mixed reality experience. In embodiments in which steps 218 and 224 are performed, step 228 may include step 230. At step 230, the method may include receiving, from the server computing device, a determination of a gaze direction of the user based on the inward-facing imaging data. In such embodiments, the user interaction may include gazing at the virtual content item.

In embodiments in which steps 220 and 226 are performed, step 228 may include step 232. At step 232, the method 200 may include receiving, from the server computing device, a determination of a change in position of the head-mounted display device based on the position data. In such embodiments, the user interaction may include the change in position.

In embodiments in which the imaging data collected at step 202 and transmitted to the server computing device at step 206 is determined to include a gesture selecting the virtual content item, step 228 may include step 234. At step 234, the method 200 may include receiving, from the server computing device, a determination that the imaging data includes a gesture selecting the virtual content item. For example, in response to a user interaction including a dragging gesture, a virtual content item may be relocated to a new position. If the new position is already occupied by a virtual object, that virtual object may also be relocated so that it does not overlap with the virtual content item.

Figure 8:
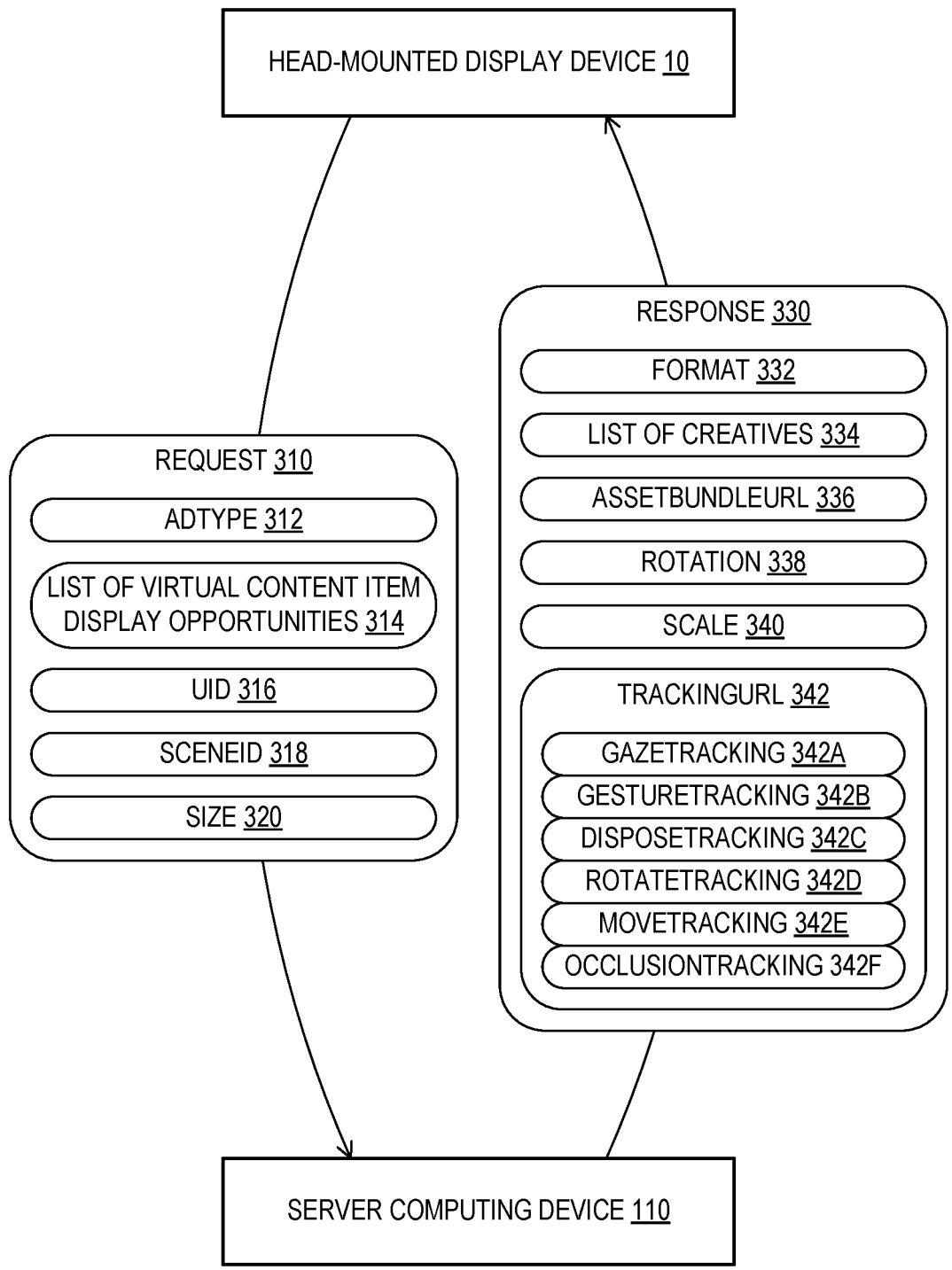
FIG. 8 schematically shows an example request sent by a head-mounted display device and an example response sent by a server computing device, according to the embodiment of FIG. 1.

An example implementation of a virtual content item request 310 and a virtual content item response 330 are provided below with reference to FIG. 8. In the following example, the virtual content item is an advertisement. The request 310 in the example of FIG. 8 includes a plurality of parameters. These parameters may include an adtype 312 which specifies a type of advertisement to display. For example, the adtype 312 may indicate that the advertisement is a tabletop advertisement configured to be displayed on a table or other substantially flat, horizontal surface. Alternatively, the adtype 312 may indicate that the advertisement is a wall poster configured to be displayed on a substantially flat vertical surface. In some embodiments, the adtype 312 may indicate that the advertisement includes a plurality of virtual content items to be displayed at different dynamically positioned locations. For example, the advertisement may include a virtual person standing on a flat surface and may further include a virtual vehicle driving along a road.

The parameters included in the request 310 may further include a list 314 of virtual content item display opportunities 44 indicating one or more dynamically positioned content locations at which the advertisement may be displayed, such as a tabletop, a chair top, a road, or a wall. The parameters of the request 310 may further include a user identification (uid) 316 that indicates the user 90 of the head-mounted display device 10 from which the request 310 is sent. In some embodiments, a new uid 316 may be generated for each session in which the head-mounted display device 10 is used. The request 310 may further include a parameter indicating a sceneID 318 may include information about the mixed reality experience 40 and/or one or more physical features 26 identified in the physical environment 24. The parameters included in the request 310 may further include a size 320 of the advertisement. The size 320 may indicate a size category such as small, medium, or large. Additionally or alternatively, the size 320 may indicate one or more dimensions of the advertisement. In addition to the parameters listed above, the request 310 may include one or more other parameters in some embodiments.

The response 330 sent from the server computing device 110 to the head-mounted display device 10 may include a plurality of parameters, which may include a format 332. The format 332 may indicate the advertisement type of the advertisement sent from the server computing device 110 to the head-mounted display device 10. The response 330 may further include a list of creatives 334 per experience. The list of creatives 334 per experience may include information specifying an appearance of each virtual content item 60 to be displayed at the head-mounted display device 10. The term "creative" as used herein refers to data typically stored in a file that includes content that has been created by an artist. For example, creative 334 may include one or more of an image, a color, a three dimensional shape, and a sequence of animated frames or a video. One example of a creative that includes a shape is a three dimensional object of an OBJ file type. Creative 334 may further include sound data, haptic feedback data, or other information specifying how the virtual content item 60 is presented via another output device of the head-mounted display device 10.

The response 330 may further include an assetBundleUrl 336 that indicates a unique resource locator (URL) at which the creative 334 may be accessed. The response 330 may further include a rotation 338 indicating a rotation performed on the virtual content item 60 relative to a default orientation. Additionally or alternatively, the response 330 may include a scale 340 indicating a scale factor applied to the virtual content item 60 relative to a default size.

The parameters of the response 330 may further include a trackingUrl 342 indicating one or more URLs that may be accessed in response to user interaction 62 with the virtual content item 60. For example, trackingUrl 342 may include URLs such as gazeTracking 342A to be accessed when the user 90 gazes at the advertisement and/or gestureTracking 342B to be accessed when the user 90 makes a gesture manipulating the advertisement. The trackingUrl 342 may further include disposeTracking 342C to be accessed when the advertisement ceases to be displayed, rotateTracking 342D to be accessed when the advertisement is rotated, moveTracking 342E to be accessed when the advertisement is moved, and/or occlusionTracking 342F to be accessed when the advertisement is occluded by a physical or virtual object. Other URLs may be included in trackingURL 342 in some embodiments. In addition to the parameters listed above, the response 330 may include one or more other parameters in some embodiments.

Example code specifying the response 330 is shown below:

```
{
    "format":"MR-AD-FORMAT",
    "creatives":{
        "creative":{
            PlacementId:A1001
            "objurl":"https://s3.ap-south-1.example.com/splititdynamic/MR-Hack/soda-bottle.OBJ",
            "mtlurl":"PutSomeLink",
            "assetBundleURL":"https://s3.ap-south-1.example.com/splititdynamic/MR-Hack/soda-ab",
            "assetBundleAdObjectKey":"PutSomelink",
            "daeFileName":"https://s3.ap-south-1.example.com/splititdynamic/MR-Hack/bottle.dae",
            "rotation":{
                "type":"self",
                "x":-90,
                "y":270,
                "z":0
            },
            "scale":{
                "x":0.004,
                "y":0.004,
                "z":0.004
            }
        },
        "trackingURL":{
            "impressionBeacon":"https://adbroker-int.mp.dse.example.com/v1/adbroker/beacon/impressionBeacon",
            "gazebeacon":"https://adbroker-int.mp.dse.example.com/v1/adbroker/beacon/gaze/TableTop%40kousikMRDEV%40example.com%40Ball-throw-box",
            "gesturebeacon":"https://adbroker-int.mp.dse.example.com/v1/adbroker/beacon/gesture/TableTop%40kousikMRDEV%40example.com%40Ball-throw-box",
            "rotatebeacon":"PutSomelink",
            "movebeacon":"PutSomelink",
            "occlusionbeacon":"PutSomelink",
            "disposeBeacon":"PutSomelink"
        },
        "callToAction":{
            "OnGaze":"Do_Nothing",
            "OnGesture":"Do_Nothing"
        }
    }
}
```

In some embodiments, a virtual content item provider may specify the one or more parameters of the response 330 and the one or more constraints 42 on the placement of a virtual content item 60, which may be stored in the memory 112 of the server computing device 100. For example, the virtual content item provider may be an advertiser who wishes to show an advertisement to a user 90 when a predetermined type of virtual content item display opportunity 60 occurs. For example, with reference to the example of FIGS. 3A-B, an advertiser may target an advertisement to be displayed when the user 90 is in a physical environment 24 that includes a television and at least one horizontal surface. The virtual content item provider may further specify one or more candidate location selection criteria based on which the dynamically positioned location 68 of the virtual content item 60 may be selected from a plurality of candidate locations 70. The virtual content item provider may additionally or alternatively specify one or more characteristics of a set of users 90 to whom the advertisement is targeted. In the example of FIGS. 3A-B, the virtual content item provider may choose to display the virtual content item 60 to the user 90 based on an indication that the user 90 has previously purchased the soft drink being advertised. In some embodiments, a plurality of virtual content item providers may bid on a virtual content item display opportunity 60 as they would bid on other forms of advertising space.

Although the above embodiments are discussed with reference to a head-mounted display device, other embodiments may be implemented with a display device that is not head-mounted. For example, the systems and methods discussed above may alternatively be used with a wall- or stand-mounted display device or a handheld display device. In such embodiments, the display device may provide a mixed-reality experience by displaying an image of the physical environment on the display along with one or more virtual objects. For example, a wall- or stand-mounted display device may act as a "window" into another area of the physical environment, such as an area behind a wall, and may display the one or more virtual objects overlapping the image of the other area of the physical environment. The image of the other area of the physical environment may be received from one or more imaging sensors located in the other area of the physical environment and communicatively coupled to the display device. Similarly, the handheld display device may include an outward-facing imaging sensor configured to image a region of the physical environment behind the display. The one or more imaging sensors may include one or more depth cameras and/or one or more RGB cameras. In other embodiments, the three-dimensional environment displayed on the display device may be a three-dimensional virtual environment.

In addition, in wall- or stand-mounted and handheld embodiments, the display device may include one or more imaging sensors configured to detect a gaze direction and/or body position of the user. For example, the handheld display device may include a user-facing imaging sensor configured to image the user. The one or more imaging sensors configured to detect the gaze direction and/or body position of the user may include one or more depth cameras and/or RGB cameras. In handheld embodiments, the display device may further include one or more position sensors configured to detect the position and orientation of the display device relative to the user. Thus, in one example, the handheld display device may display the region of the physical environment behind the display with one or more virtual objects superimposed onto the image of the physical environment.

In some embodiments, the methods and processes described herein may be tied to a computing system of one or more computing devices. In particular, such methods and processes may be implemented as a computer-application program or service, an application-programming interface (API), a library, and/or other computer-program product.

Figure 9:
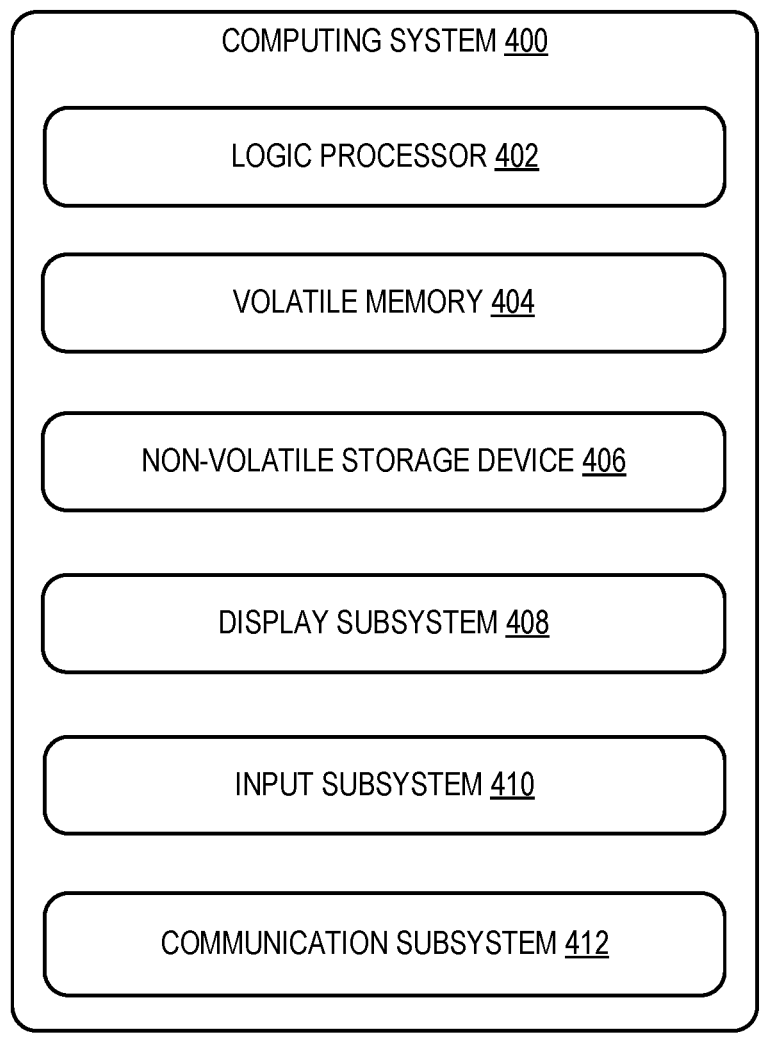
FIG. 9 shows a schematic view of an example computing environment in which the computer device of FIG. 1 may be enacted.

FIG. 9 schematically shows a non-limiting embodiment of a computing system 400 that can enact one or more of the methods and processes described above. Computing system 400 is shown in simplified form. Computing system 400 may embody the head-mounted display device 10 described above and illustrated in FIGS. 1 and 2 and/or the server computing device described above and illustrated in FIG. 6. Computing system 400 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 400 includes a logic processor 402 volatile memory 404, and a non-volatile storage device 406. Computing system 400 may optionally include a display subsystem 408, input subsystem 410, communication subsystem 412, and/or other components not shown in FIG. 9.

Logic processor 402 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 402 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 406 includes one or more physical devices configured to hold instructions executable by the logic processors to implement the methods and processes described herein. When such methods and processes are implemented, the state of non-volatile storage device 406 may be transformed—e.g., to hold different data.

Non-volatile storage device 406 may include physical devices that are removable and/or built-in. Non-volatile storage device 406 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 406 may include nonvolatile, dynamic, static, read/write, read-only, sequential-access, location-addressable, file-addressable, and/or content-addressable devices. It will be appreciated that non-volatile storage device 406 is configured to hold instructions even when power is cut to the non-volatile storage device 406.

Volatile memory 404 may include physical devices that include random access memory. Volatile memory 404 is typically utilized by logic processor 402 to temporarily store information during processing of software instructions. It will be appreciated that volatile memory 404 typically does not continue to store instructions when power is cut to the volatile memory 404.

Aspects of logic processor 402, volatile memory 404, and non-volatile storage device 406 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 400 typically implemented in software by a processor to perform a particular function using portions of volatile memory, which function involves transformative processing that specially configures the processor to perform the function. Thus, a module, program, or engine may be instantiated via logic processor 402 executing instructions held by non-volatile storage device 406, using portions of volatile memory 404. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 408 may be used to present a visual representation of data held by non-volatile storage device 406. The visual representation may take the form of a graphical user interface (GUI). As the herein described methods and processes change the data held by the non-volatile storage device, and thus transform the state of the non-volatile storage device, the state of display subsystem 408 may likewise be transformed to visually represent changes in the underlying data. Display subsystem 408 may include one or more display devices utilizing virtually any type of technology. Such display devices may be combined with logic processor 402, volatile memory 404, and/or non-volatile storage device 406 in a shared enclosure, or such display devices may be peripheral display devices.

When included, input subsystem 410 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 412 may be configured to communicatively couple various computing devices described herein with each other, and with other devices. Communication subsystem 412 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 400 to send and/or receive messages to and/or from other devices via a network such as the Internet.

According to one aspect of the present disclosure, head-mounted display device is provided, including an at least partially see-through display, one or more input devices including one or more image sensors configured to collect imaging data of a physical environment, one or more communication devices and a processor. The processor may be configured to output for display on the display a mixed reality experience including one or more virtual objects superimposed upon the physical environment. The processor may be further configured to transmit the imaging data to a server computing device via the one or more communication devices. The processor may be further configured to receive, from the server computing device, an identification of a virtual content item display opportunity. The identification of the virtual content item display opportunity may include a determination that the mixed reality experience and one or more physical features identified from the imaging data satisfy one or more spatial and/or temporal constraints. The processor may be further configured to transmit a request for one or more virtual content items to the server computing device based on the identification of the virtual content item display opportunity. The processor may be further configured to receive the one or more virtual content items from the server computing device. The processor may be further configured to output the one or more virtual content items for display on the display at one or more respective dynamically positioned content locations in the physical environment.

According to this aspect, the processor may be further configured to receive, via the one or more input devices, a user interaction with a virtual content item of the one or more virtual content items.

According to this aspect, the processor may be further configured to modify at least one virtual object in response to the user interaction.

According to this aspect, the processor may be further configured to transmit an indication of the user interaction to the server computing device via the one or more communication devices.

According to this aspect, the one or more input devices may include an inward-facing image sensor configured to collect inward-facing imaging data of a user. The processor may be further configured to transmit the inward-facing imaging data to the server computing device. The processor may be further configured to receive, from the server computing device, a determination of a gaze direction of the user based on the inward-facing imaging data. The user interaction may include gazing at the virtual content item.

According to this aspect, the one or more input devices may include a position sensor configured to collect position data of the head-mounted display device. The user interaction may include a change in position of the head-mounted display device. The processor may be further configured to transmit the position data to the server computing device.

According to this aspect, the user interaction may include a gesture selecting the virtual content item.

According to this aspect, the one or more virtual content items may be configured to interact with the one or more virtual objects of the mixed reality experience.

According to this aspect, the identification of the virtual content item display opportunity may include a determination that the one or more identified physical features have a predetermined set of geometric characteristics.

According to this aspect, the one or more spatial and/or temporal constraints may be selected from the group consisting of one or more position constraints on respective positions at which the one or more virtual content items are displayed, one or more timing constraints on respective times at which the one or more virtual content items are displayed, one or more size constraints on respective sizes of the one or more virtual content items, and one or more shape constraints on respective shapes of the one or more virtual content items.

According to this aspect, the one or more virtual content items may include one or more advertisements.

According to another aspect of the present disclosure, a method for use with a head-mounted display device is provided. The method may include collecting imaging data of a physical environment. The method may further include outputting for display on an at least partially see-through display a mixed reality experience including one or more virtual objects superimposed upon the physical environment. The method may further include transmitting the imaging data to a server computing device. The method may further include receiving, from the server computing device, an identification of a virtual content item display opportunity. The identification of the virtual content item display opportunity may include a determination that the mixed reality experience and one or more physical features identified from the imaging data satisfy one or more spatial and/or temporal constraints. The method may further include transmitting a request for one or more virtual content items to the server computing device based on the identification of the virtual content item display opportunity. The method may further include receiving the one or more virtual content items from the server computing device. The method may further include outputting the one or more virtual content items for display on the display at one or more respective dynamically positioned content locations in the physical environment.

According to this aspect, the method may further include receiving, via one or more input devices, a user interaction with a virtual content item of the one or more virtual content items.

According to this aspect, the method may further include transmitting an indication of the user interaction to the server computing device.

According to this aspect, the method may further include collecting inward-facing imaging data of a user. The method may further include transmitting the inward-facing imaging data to the server computing device. The method may further include receiving, from the server computing device, a determination of a gaze direction of the user based on the inward-facing imaging data. The user interaction may include gazing at the virtual content item.

According to this aspect, the user interaction may include a gesture selecting the virtual content item.

According to this aspect, the one or more virtual content items may be configured to interact with the one or more virtual objects of the mixed reality experience.

According to this aspect, the one or more spatial and/or temporal constraints may be selected from the group consisting of one or more position constraints on respective positions at which the one or more virtual content items are displayed, one or more timing constraints on respective times at which the one or more virtual content items are displayed, one or more size constraints on respective sizes of the one or more virtual content items, and one or more shape constraints on respective shapes of the one or more virtual content items.

According to another aspect of the present disclosure, a server computing device is provided, including one or more communication devices communicatively coupled to a display device and a processor configured to receive imaging data from the display device. The processor may be further configured to, based on the imaging data, identify one or more physical features in the physical environment of the display device. The processor may be further configured to identify a virtual content item display opportunity at least in part by determining that the one or more physical features identified at the display device satisfy one or more spatial and/or temporal constraints. The processor may be further configured to select, based on the virtual content item display opportunity, one or more virtual content items from a plurality of virtual content items. The processor may be further configured to select, based on the virtual content item display opportunity, one or more respective dynamically positioned content locations at which to display the one or more virtual content items in the physical environment of the display device. The processor may be further configured to convey the one or more virtual content items and one or more respective dynamically positioned content locations to the display device.

According to this aspect, the processor may be further configured to receive a user interaction with a virtual content item of the one or more virtual content items from the display device.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A head-mounted display device, comprising:
an at least partially see-through display;
one or more input devices including:
one or more image sensors configured to collect imaging data of a physical environment; and
an inward-facing image sensor configured to collect inward-facing imaging data of a user;
one or more communication devices; and
a processor configured to:
output for display on the display a mixed reality experience including one or more virtual objects superimposed upon the physical environment;
transmit the imaging data to a server computing device via the one or more communication devices;
receive, from the server computing device, an identification of a virtual content item display opportunity, wherein the identification of the virtual content item display opportunity includes a determination that the mixed reality experience and one or more physical features identified from the imaging data satisfy spatial and temporal constraints;
transmit a request for a virtual content item to the server computing device based on the identification of the virtual content item display opportunity, wherein the request includes a dynamically positioned content item location in the physical environment indicated by the virtual content item display opportunity;
in response to transmitting the request, receive a response from the server computing device, the response including the virtual content item; and
output the virtual content item for display on the display at the selected dynamically positioned content item location;
determine, based at least in part on the inward-facing imaging data, that the user is gazing at the virtual content item and that the virtual content item is occluded by a physical object or a virtual object; and
transmit an indication of a user interaction to the server computing device via the one or more communication devices, wherein:
the user interaction includes gazing at the virtual content item; and
the user interaction further indicates that the virtual content item is occluded.

2. The head-mounted display device of claim 1, wherein the processor is further configured to modify at least one virtual object in response to the user interaction.

3. The head-mounted display device of claim 1, wherein the processor is further configured to:
transmit the inward-facing imaging data to the server computing device; and
receive, from the server computing device, a determination of a gaze direction of the user based on the inward-facing imaging data.

4. The head-mounted display device of claim 1, wherein:
the one or more input devices include a position sensor configured to collect position data of the head-mounted display device;
the user interaction includes a change in position of the head-mounted display device; and
the processor is further configured to transmit the position data to the server computing device.

5. The head-mounted display device of claim 1, wherein the user interaction includes a gesture selecting the virtual content item.

6. The head-mounted display device of claim 1, wherein the identification of the virtual content item display opportunity includes a determination that the one or more identified physical features have a predetermined set of geometric characteristics.

7. The head-mounted display device of claim 1, wherein the spatial and temporal constraints further include:
one or more size constraints on respective sizes of the virtual content item; and/or
one or more shape constraints on respective shapes of the virtual content item.

8. The head-mounted display device of claim 1, wherein the virtual content item is an advertisement.

9. A method for use with a head-mounted display device, the method comprising:
  collecting imaging data of a physical environment;
  collecting inward-facing imaging data of a user;
  outputting for display on an at least partially see-through display a mixed reality experience including one or more virtual objects superimposed upon the physical environment;
  transmitting the imaging data to a server computing device;
  receiving, from the server computing device, an identification of a virtual content item display opportunity, wherein the identification of the virtual content item display opportunity includes a determination that the mixed reality experience and one or more physical features identified from the imaging data satisfy spatial and temporal constraints;
  transmitting a request for a virtual content item to the server computing device based on the identification of the virtual content item display opportunity, wherein the request includes a dynamically positioned content item location in the physical environment indicated by the virtual content item display opportunity;
  in response to transmitting the request, receiving a response from the server computing device, the response including the virtual content item; and
  outputting the virtual content item for display on the display at the selected dynamically positioned content item location;
  determining, based at least in part on the inward-facing imaging data, that the user is gazing at the virtual content item and that the virtual content item is occluded by a physical object or a virtual object; and
  transmitting an indication of a user interaction to the server computing device via the one or more communication devices, wherein:
    the user interaction includes gazing at the virtual content item; and
    the user interaction further indicates that the virtual content item is occluded.

10. The method of claim 9, further comprising:
  transmitting the inward-facing imaging data to the server computing device; and
  receiving, from the server computing device, a determination of a gaze direction of the user based on the inward-facing imaging data.

11. The method of claim 9, wherein the user interaction includes a gesture selecting the virtual content item.

12. The method of claim 9, wherein the spatial and temporal constraints further include:
  one or more size constraints on respective sizes of the virtual content item; and/or
  one or more shape constraints on respective shapes of the virtual content item.

13. A server computing device, comprising:
  one or more communication devices communicatively coupled to a display device; and
  a processor configured to:
    receive imaging data from the display device, wherein the imaging data includes outward-facing imaging data of a physical environment and inward-facing imaging data of a user;
    based on the imaging data, identify:
      one or more physical features in the physical environment of the display device; and
      a gaze direction of the user;
  identify a virtual content item display opportunity at least in part by determining that the one or more physical features identified at the display device satisfy spatial and temporal constraints;
  select, based on the virtual content item display opportunity, a virtual content item from a plurality of virtual content items;
  based on the virtual content item display opportunity, select a dynamically positioned content item location at which to display the virtual content item in the physical environment of the display device, wherein the dynamically positioned content item location is selected according to one or more candidate location scoring criteria including, for each candidate location, at least one of:
    a distance from the user to the candidate location;
    an angular displacement between the candidate location and the gaze direction of the user;
    a proximity of the candidate location to one or more virtual objects superimposed on the physical environment of the display device;
    a size of the candidate location;
    a user-specified preference; or
    the identification of the one or more physical features in the physical environment of the display device;
  convey the virtual content item and the dynamically positioned content item location to the display device;
  receive a user interaction with the virtual content item from the display device, wherein receiving the user interaction includes determining, based at least in part on the gaze direction of the user, that the user is gazing at the virtual content item; and
  determine that the virtual content item at which the user gazes during the user interaction is occluded.

* * * * *